US008865294B2

(12) United States Patent
Cisek et al.

(10) Patent No.: US 8,865,294 B2
(45) Date of Patent: Oct. 21, 2014

(54) THERMOPLASTIC MULTI-PLY FILM WITH METALLIC APPEARANCE

(71) Applicant: The Glad Products Company, Oakland, CA (US)

(72) Inventors: Kenneth E. Cisek, Chicago, IL (US); Theodore J. Fish, Downers Grove, IL (US); Tim LaRocque, Oak Forest, IL (US); Robert W. Fraser, Lombard, IL (US)

(73) Assignee: The Glad Products Company, Oakland, CA (US)

( * ) Notice: Subject to any disclaimer, the term of this patent is extended or adjusted under 35 U.S.C. 154(b) by 91 days.

(21) Appl. No.: 13/660,844

(22) Filed: Oct. 25, 2012

(65) Prior Publication Data
US 2014/0119679 A1    May 1, 2014

(51) Int. Cl.
*B32B 3/00* (2006.01)

(52) U.S. Cl.
USPC .................. 428/195.1; 428/198; 428/208

(58) Field of Classification Search
USPC ................................ 428/195.1, 208
See application file for complete search history.

(56) References Cited

U.S. PATENT DOCUMENTS

2012/0269465 A1* 10/2012 Dorsey et al. ................ 383/105
2012/0269466 A1* 10/2012 Dorsey et al. ................ 383/109

* cited by examiner

*Primary Examiner* — Elizabeth Mulvaney
(74) *Attorney, Agent, or Firm* — Thomas C. Feix

(57) ABSTRACT

Laminated multi-ply films where one film layer is substantially unpigmented and the other film layer is substantially pigmented can provide a metallic appearance when the substantially unpigmented film layer is cold stretched either prior to lamination or during the lamination step. This surprising result provides an inexpensive way to produce films with a metallic appearance. Trash bags having an inner bag and an outer bag laminated together may be formed according to this process.

14 Claims, 17 Drawing Sheets

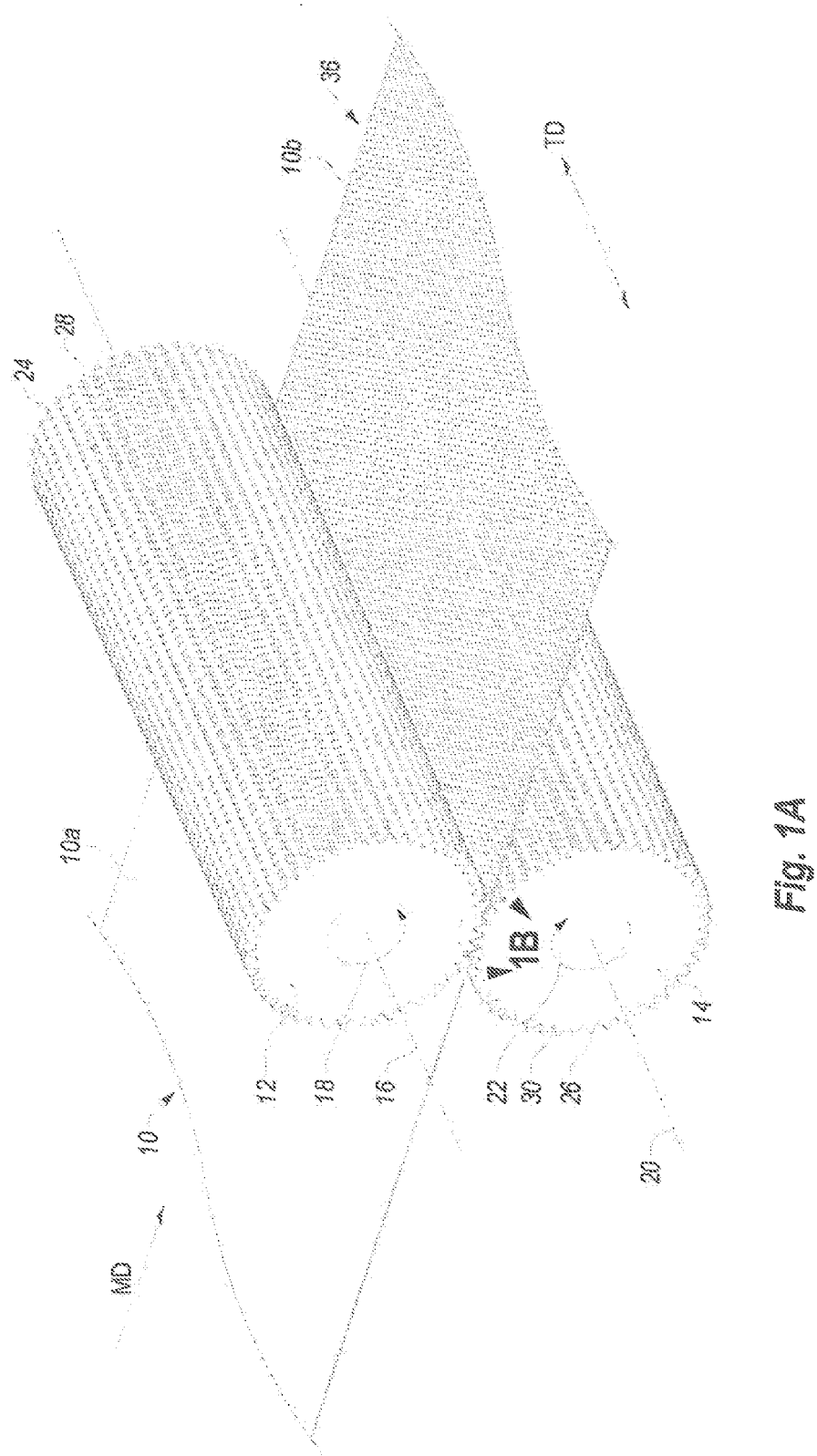

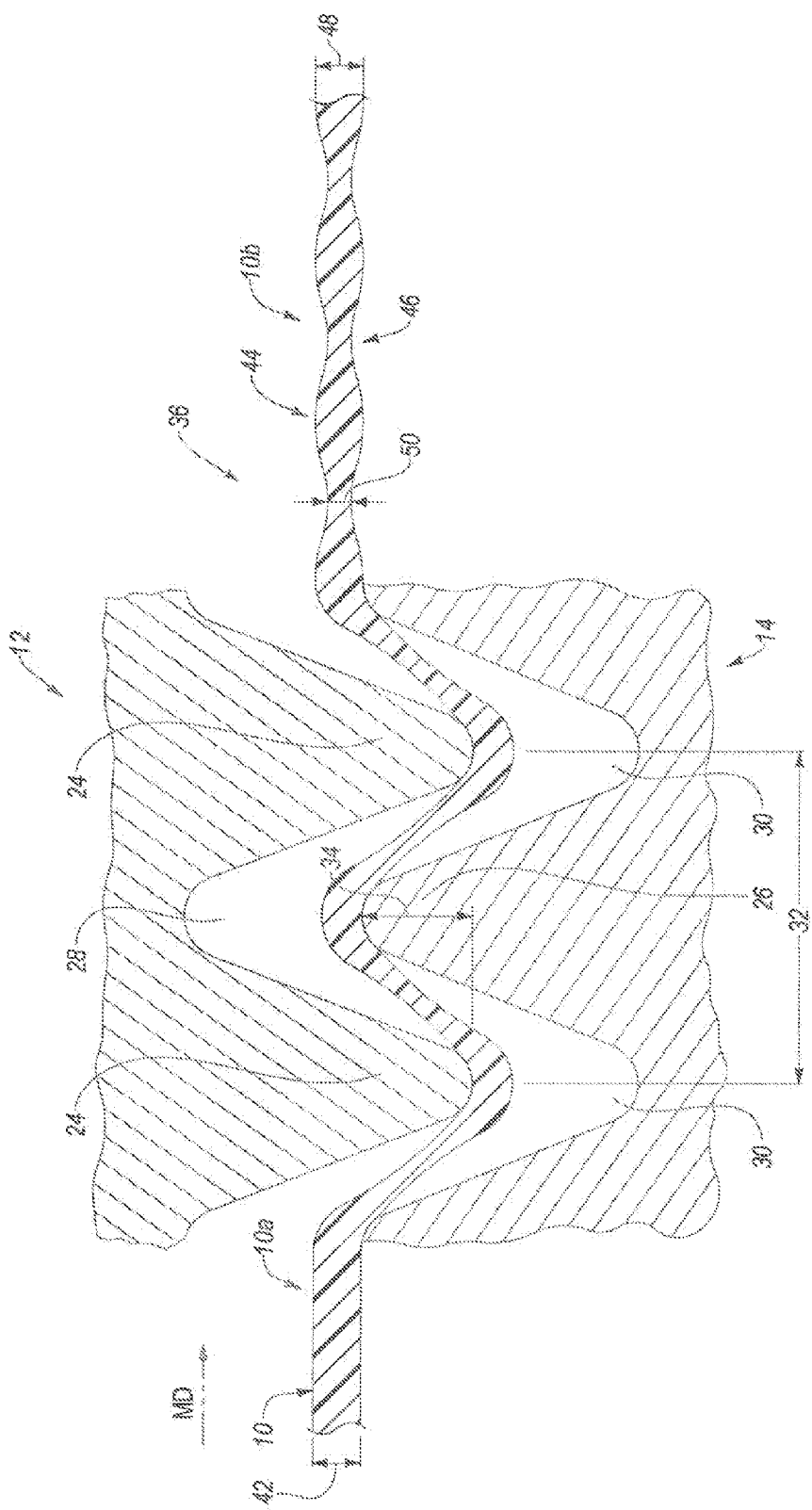

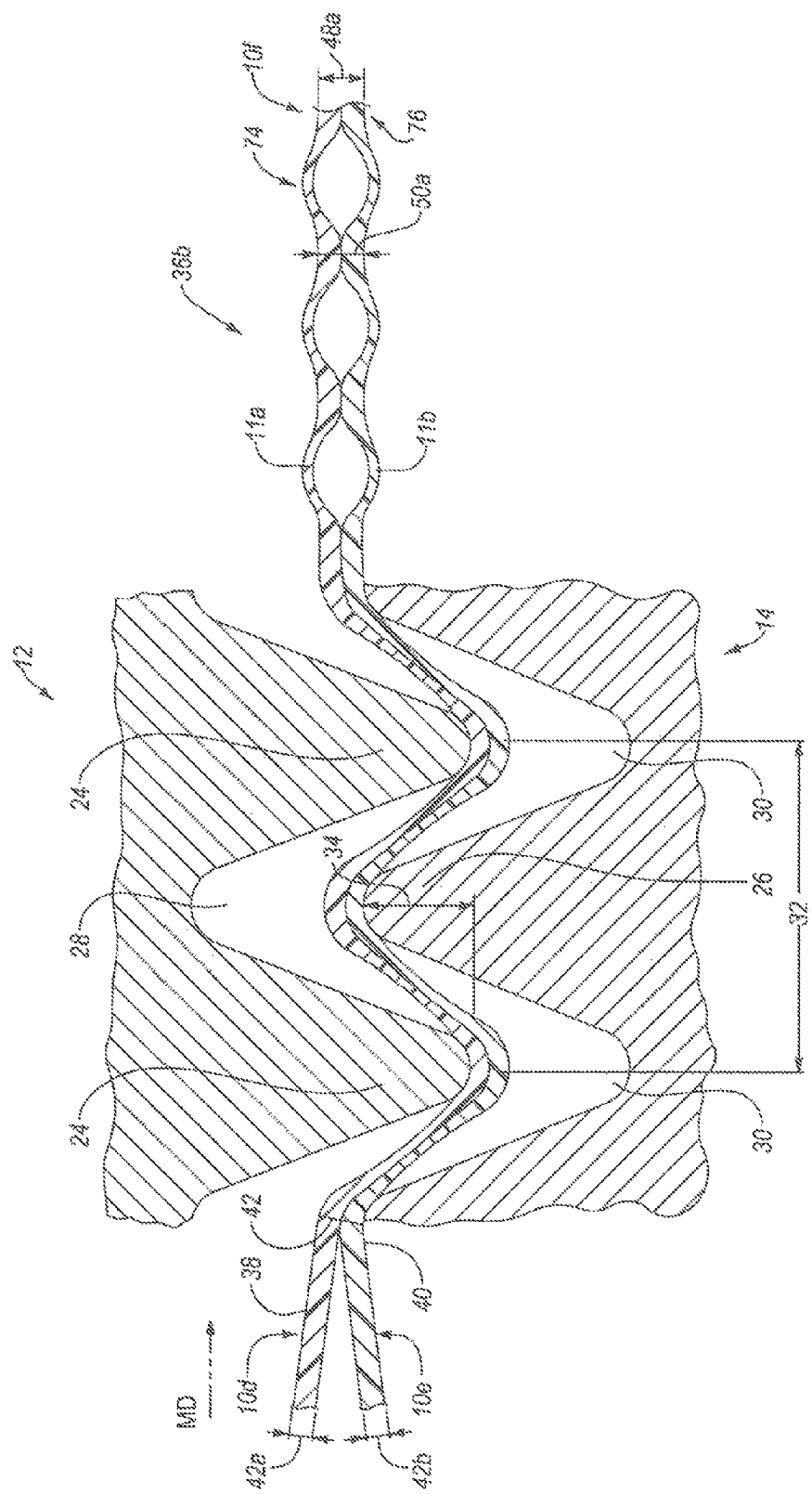

US 8,865,294 B2

THERMOPLASTIC MULTI-PLY FILM WITH METALLIC APPEARANCE

BACKGROUND OF THE INVENTION

1. Field of the Invention

The present invention relates generally to laminated multi-ply thermoplastic film. Specifically, the invention relates to multi-ply film where one film layer is substantially un-pigmented and the other film layer is substantially pigmented. In one embodiment, the invention relates to trash bags of thermoplastic films having both an outer bag and an inner bag that are laminated together to form a multi-ply trash bag.

2. Description of the Related Art

A multitude of consumer and packaging products are made from low-cost, pliable thermoplastic films. Multi-ply films can provide improved physical properties over single ply films, however they may have higher material and processing costs that may outweigh the additional benefit in physical properties. Creating films with a metallic appearance may add additional cost because of the high cost of metallic pigments. There is a clear need to provide thermoplastic multi-ply films with an improved metallic appearance and improved performance at costs appropriate for a wide range of uses.

BRIEF SUMMARY OF THE INVENTION

Implementations of the present invention solve one or more problems in the art with apparatus and methods for creating trash bags with an outer bag and an inner bag with increased strength, decrease total amount of materials, and unique appearance. In particular, one or more implementations provide for bags having a unique metallic looking appearance.

BRIEF DESCRIPTION OF THE DRAWINGS

The foregoing aspects and others will be readily appreciated by the skilled artisan from the following description of illustrative embodiments when read in conjunction with the accompanying drawings, in which:

FIG. 1A illustrates a schematic diagram of a film ply being cold stretched by MD intermeshing rollers in accordance with one or more implementations of the present invention;

FIG. 1B illustrates an enlarged view of a thermoplastic film passing together through the intermeshing rollers of FIG. 1A taken along the circle 1B of FIG. 1 to form a cold stretched film ply;

FIG. 5A illustrates a view of a multi-ply laminated thermoplastic film created by the intermeshing rollers of FIG. 1A;

FIGS. 1A-1F are perspective views of a thermoplastic bag having a draw tape;

DETAILED DESCRIPTION

Figure 2:
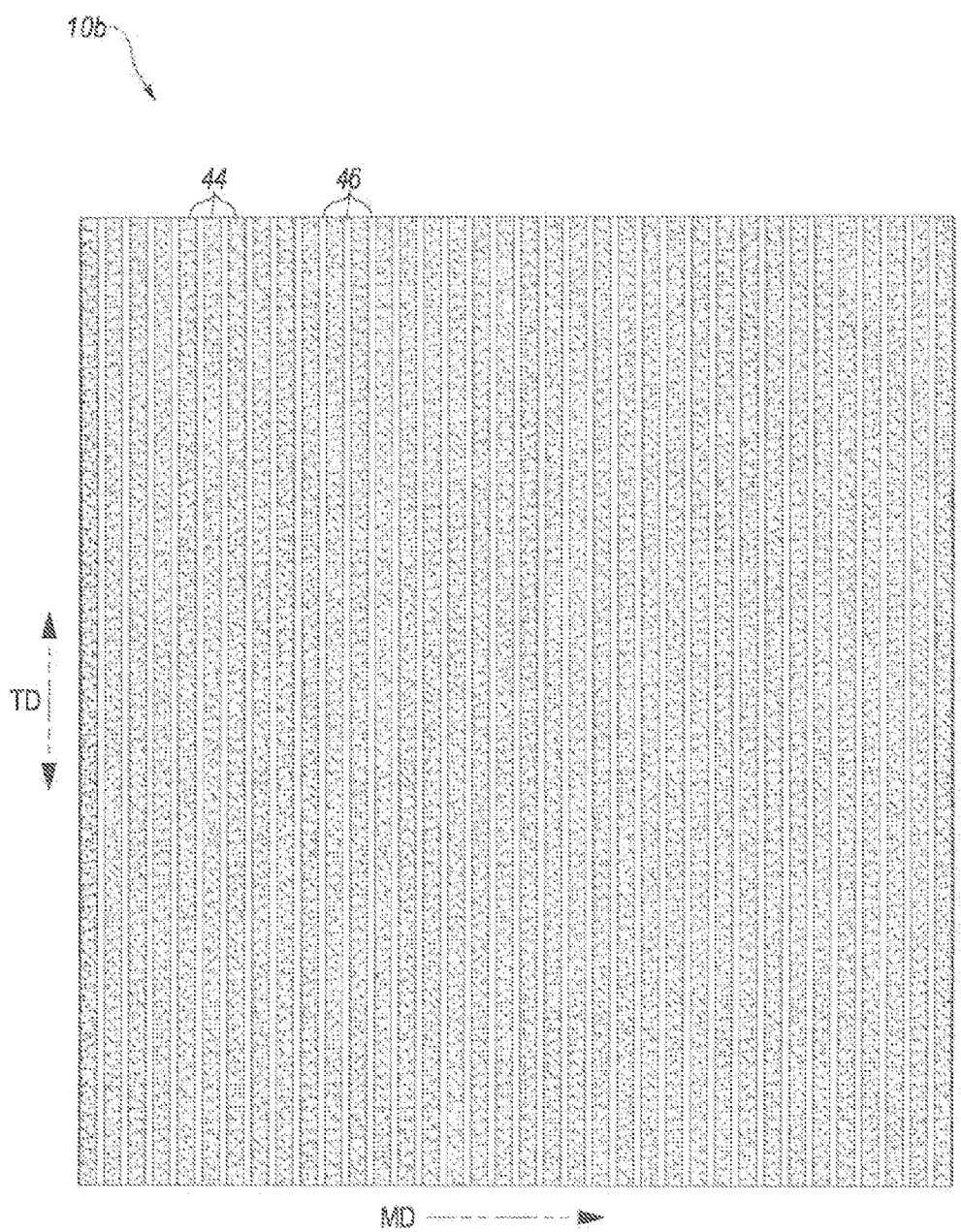
FIG. 2 illustrates a view of a cold stretched thermoplastic film created by the intermeshing rollers of FIG. 1A.

Reference will now be made to the drawings wherein like numerals refer to like parts throughout. For ease of description, the components of this invention are described in the normal (upright) operating position, and terms such as upper, lower, horizontal, top, bottom, etc., are used with reference to this position. It will be understood, however, that the components embodying this invention may be manufactured, stored, transported, used, and sold in an orientation other than the position described.

Figures illustrating the components of this invention show some conventional mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

All publications, patents and patent applications cited herein, whether supra or infra, are hereby incorporated by reference in their entirety to the same extent as if each individual publication, patent or patent application was specifically and individually indicated to be incorporated by reference.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As used herein, the term "orientation" refers to the molecular organization within a polymer film, i.e., the orientation of molecules relative to each other. Similarly, the process by which "orientation" or directionality of the molecular arrangement is imparted to the film refers to processes whereas the polymer is molten and not in the solid state. An example where process of orientation is employed to impart desirable properties to films, includes making cast films where higher MD tensile properties are realized. Depending on whether the film is made by casting as a flat film or by blowing as a tubular film, the orientation process employs substantially different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film. When a film has been oriented in a single direction (monoaxial orientation), the resulting film exhibits great strength and stiffness along the direction of orientation, but it is weak in the other direction, i.e., orthogonal to the direction of the primary orientation, often splitting or tearing when flexed or pulled.

As used herein, the phrase "machine direction", herein abbreviated "MD", or "longitudinal direction", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "thermoplastic" refers to a synthetic plastic becoming soft when heated and rehardening on cooling without appreciable change of properties. As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

Useful materials in the inventive films include but are not limited to thermoplastic polyolefins, including polyethylene and copolymers thereof and polypropylene and copolymers thereof. The olefin based polymers include the most common ethylene or propylene based polymers such as polyethylene (including HDPE, LDPE, LLDPE, and VLDPE), polypropylene, and copolymers such as ethylene vinylacetate (EVA), ethylene methyl acrylate (EMA) and ethylene acrylic acid (EAA), or blends of such polyolefins. Other examples of polymers suitable for use as films include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber. This new class of rubber-like polymers may also be employed and they are generally referred to herein as metallocene polymers or polyolefins produced from single-cite catalysts. The most preferred catalysts are known in the art as metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly(ethylene-octene), poly(ethylene-propylene), and/or polyolefin terpolymers thereof. It can be suitable to blend into the resin a suitable amount of a cling agent, such as polyisobutylene, to control the level of lamination during the lamination process.

As the term "high density polyethylene" (HDPE) is used herein, it is defined to mean an ethylene-containing polymer having a density of 0.940 or higher. (Density (d) is expressed as $g/cm^3$) One particularly suitable HDPE for use with the methods of the present invention is the resin sold as M6211 (d=0.958) by Equistar. Another particularly suitable HDPE is the resin sold as HD 7845.30 (d=0.958) by Exxon. Other suitable HDPE resins include, for example, BDM 94-25 (d=0.961) and 6573×HC (d=0.959) which are both available from Fina Oil and Chemical Co., Dallas, Tex. and Sclair 19C (d=0.951) and 19F (d=0.961) which are both available from Nova Corporation, Sarnia, Ontario, Canada.

The Melt Index (MI) of the HDPE useful according to the prevention is in the range of from about 0.01 to about 10. (Melt Index is expressed as g/10 min.) Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The term "low density polyethylene" (LDPE) as used herein is defined to mean an ethylene-containing polymer having a density of about 0.926 or lower and a MI of about 7. LDPE is readily available, e.g., PE 1017 (MI=7; d=0.917) from Chevron, San Francisco, Calif., SLP 9045 (MI=7.5; d=0.908) from Exxon, Houston, Tex., and ZCE 200 (MI=3; d=0.918) from Mobil Chemical Corporation, Fairfax, Va.

The term "very low density polyethylene" (VLDPE) as used herein is defined to mean an ethylene-based hexane copolymer having a density of from about 0.890 to about 0.915 and a MI of from about 3 to about 17. VLDPE is readily available from Exxon, e.g., Exact Plastomer SLP-9087 (MI=7.5; d=0.900) and Exact Plastomer SLP-9088 (MI=16.5; d=0.900). Other suitable VLDPE resins include, for example, product No. XPR 0545-33260 46L (MI=3.3; d=0.908) from Dow Chemical Company, Midland, Mich.

The term "linear low density polyethylene" (LLDPE) as used herein is defined to mean a copolymer of ethylene and a minor amount of an olefin containing 4 to 10 carbon atoms, having a density of from about 0.910 to about 0.926 and a MI of from about 0.5 to about 10. LLDPE is readily available, e.g., Dowlex® 2045.03 (MI=1.1; d=0.920) from Dow Chemical Company, Midland, Mich.

Materials such as HDPE, when used alone or in combinations with other thermoplastics in the substantially un-pigmented and cold stretched ply, may give a greater degree of metallic appearance to a laminate with a substantially pigmented ply than lower density materials, such as LDPE. In addition, adding a voiding agent, even to materials such as LDPE or LLDPE, may give a greater degree of metallic appearance to a laminate with a substantially pigmented ply than lower density materials, such as LDPE. Some examples of voiding agents suitable for use in the present invention include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, incompatible polymers, etc. In one or more implementations, the voiding agent any be any inorganic or organic material with a relatively lower elasticity than the thermoplastic material of the film. One will appreciate in light of the disclosure herein that the foregoing list of voiding agents are examples of some of the voiding agents that may be suitable for use with the present invention.

As used herein, the term "cold stretched" refers to the process of cold stretching of the polymer film between geared or non-geared rollers under conditions where the polymer film is stretched at substantially ambient conditions. Examples of processes for "cold stretching" include MD ring rolling, TD ring rolling, and strainable network formation. Such process as heated extrusion using casting and blown film extrusion or heated embossing are not processes for stretching. Extruded film may be extruded completely flat or extruded with ribs or other designs. These extruded films are not cold stretched unless processed further by a cold stretching process.

As used herein, the term "substantially un-pigmented" refers to a thermoplastic ply or plies that are substantially free of a significant amount of pigment such that the ply is substantially transparent or translucent. As used herein, the term "substantially pigmented" refers to a thermoplastic ply or plies that are pigmented such that the ply is substantially opaque. As used herein, the term "pigment or pigments" are solids of an organic and inorganic nature which are defined as such when they are used within a system and incorporated into the thermoplastic, absorbing part of the light and reflecting the complementary part thereof which forms the color of the thermoplastic ply. As used herein, the term "pigment or pigments" does not include white opacifying agents such as titanium dioxide. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketopyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

As used herein, the terms "lamination," "laminate," and "laminated film," refer to the process and resulting product made by bonding together two or more plies of film or other material. The term "bonding", when used in reference to bonding of multiple plies of a multi-ply film, may be used interchangeably with "lamination" of the plies. According to methods of the present invention, adjacent plies of a multi-ply film are laminated or bonded to one another. In some embodiments, the bonding purposely results in a relatively weak bond between the plies that has a bond strength that is less than the strength of the weakest ply of the film. This allows the lamination bonds to fail before the film ply, and thus the film, fails.

The term laminate does not include heated coextruded multilayer films comprising one or more tie layers. As a verb, "laminate" means to affix or adhere (by means of, for example, adhesive bonding, pressure bonding (e.g., ring rolling, embossing, strainable network formation or SELFing), ultrasonic bonding, corona lamination, and the like) two or more separately made film articles to one another so as to form a multi-ply structure. As a noun, "laminate" means a product produced by the affixing or adhering just described.

In one or more implementations, the lamination or bonding between plies of a multi-ply film may be non-continuous (i.e., discontinuous or partial discontinuous). As used herein the terms "discontinuous bonding" or "discontinuous lamination" refers to lamination of two or more plies where the lamination is not continuous in the machine direction and not continuous in the transverse direction. More particularly, discontinuous lamination refers to lamination of two or more plies with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

As used herein the terms "grided discontinuous bonding" or "grided discontinuous lamination" refers to lamination of two or more layers where the lamination is substantially continuous in the machine direction and in the transverse direction, but the lamination is broken up by a regular pattern of discrete un-bonded areas surrounded by continuous bonded regions in both the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

Lamination may also be either stretched lamination or un-stretched lamination. Continuous lamination, for example by flat plate heated lamination or continuous adhesive lamination, is generally un-stretched. Discontinuous or partially discontinuous lamination can be stretched or un-stretched. Examples of un-stretched discontinuous lamination include discontinuous adhesive lamination or discontinuous heated embossing. Examples of stretched discontinuous lamination include MD ring rolling, TD ring rolling, and strainable network formation.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In one embodiment, the invention comprises a laminated multi-ply thermoplastic film comprising a first film ply being substantially un-pigmented and cold stretched; and a second film ply being substantially pigmented; wherein the first film ply and the second film ply are discontinuously laminated or partially discontinuously laminated together.

In another embodiment, the invention comprises a laminated multi-ply thermoplastic film comprising a first film ply being substantially un-pigmented; and a second film ply being substantially pigmented; wherein the first film ply and the second film ply are discontinuously laminated or partially discontinuously laminated together by a process that results in cold stretching of at least one of the film plies.

In another embodiment, the invention comprises bag having an interior and an exterior and comprising an outer bag having a first sidewall made of flexible thermoplastic web material and a second sidewall of flexible thermoplastic web material, overlaid and joined to the first sidewall to provide an outer bag interior volume, the first and second sidewalls joined along a first sealed side edge, an opposite second sealed side edge, and a closed bottom edge, the first and second sidewalls un-joined along their respective top edges to define an opening opposite the bottom edge; and an inner bag separated from and within the interior volume of the outer bag and having a first sidewall made of flexible thermoplastic web material and a second sidewall of flexible thermoplastic web material, overlaid and joined to the first sidewall to provide an inner bag interior volume, the first and second sidewalls of the inner bag joined along the first sealed side edge and the second sealed side edge of the outer bag, and a closed bottom edge of the inner bag, the first and second sidewalls un-joined along their respective top edges to define an opening opposite the bottom edge for accessing the inner bag interior volume; wherein the outer bag web material is substantially un-pigmented and has been stretched by a cold stretch formation process selected from the group consisting of MD ring rolling, TD ring rolling, and strainable network formation, and wherein the inner bag web material is substantially pigmented.

Referring now to the Figures, FIGS. 1A and 1B illustrate one exemplary process of incrementally stretching a thermoplastic film. In particular, FIGS. 1A and 1B illustrate an MD ring rolling process that incrementally stretches a thermoplastic film 10 by passing the film 10 through a pair of MD intermeshing rollers 12, 14. The MD ring rolling process cold stretches the film 10 in the machine direction.

As shown by FIGS. 1A and 1B, the first roller 12 and the second roller 14 can each have a generally cylindrical shape. The rollers 12, 14 may be made of cast and/or machined metal, such as, steel, aluminum, or any other suitable material. The rollers 12, 14 can rotate in opposite directions about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The intermeshing rollers 12, 14 can closely resemble fine pitch spur gears. In particular, the rollers 12, 14 can include a plurality of protruding ridges 24, 26. The ridges 24, 26 can extend along the rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A and 1B also illustrate that grooves 28, 30 can separate adjacent ridges 24, 26. The configuration of the ridges 24, 26 and grooves 28, 30 can dictate the amount stretching that a film passing through the MD intermeshing rollers 12, 14 undergoes.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different rollers 12, 14 during intermeshing. The ratio of DOE 34 to pitch 32 can determine, at least in part, the amount of stretch imparted by a pair of intermeshing rollers 12, 14.

As the thermoplastic film 10 passes between the intermeshing rollers 12, 14, the ridges 24, 26 can incrementally cold stretch the film 10 in the machine direction. Additionally, the rollers 12, 14 can impart or form a generally striped pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

FIGS. 1A and 1B illustrate that the film 10a comprises a single ply film. In any event, FIGS. 1A and 1B illustrate the intermeshing rollers 12, 14 can process the film 10a into a MD incrementally, cold stretched film 10b. As previously mentioned, the MD incrementally, cold stretched film 10b can include a striped pattern 36. The striped pattern 36 can include alternating series of "un-stretched" regions or thicker ribs 44 and stretched regions or thinner ribs 46. Because of the cold stretching process between rollers 12, 14, the thicker ribs 44 are generally symmetrical about the plane of the film 10 and thinner ribs 46 are generally symmetrical about the plane of the film 10, when the film 10 is symmetrical about the plane of the film prior to stretching. In one or more implementations, the "un-stretched" regions of the incrementally-stretched films may be stretched to a small degree. In any event, the "un-stretched" regions can be stretched significantly less compared to the stretched regions.

The thicker ribs or un-stretched regions 44 can have a first average thickness or gauge 48. The first average gauge 48 can be approximately equal to the starting gauge 42. In one or more implementations, the first average gauge 48 can be less than the starting gauge 42. The thinner ribs or stretched regions 46 can have a second average thickness or gauge 50. In one or more implementations, the second average gauge 50 can be less than both the starting gauge 42 and the first average gauge 48. In one or more implementations, the thicker ribs or un-stretched regions 44 and the thinner ribs or stretched regions 46 are not corrugated and lie in the same plane to give a ribbed flat film. One will appreciate in light of the disclosure herein that the striped pattern 36 may vary depending on the method used to incrementally cold stretch the film 10. To the extent that MD ring rolling is used to incrementally cold stretch the film 10, the striped pattern 36 on the film 10 can depend on the pitch 32 of the ridges 24, 26, the DOE 34, and other factors.

FIG. 2 illustrates a top view of the MD incrementally, cold stretched film 10b. The thicker ribs 44 and thinner ribs 46 can extend across the film 10b in a direction transverse (i.e., transverse direction) to a direction in which the film was extruded (i.e., machine direction). The pitch 32 and the DOE 34 of the ridges 24, 26 of the MD intermeshing rollers 12, 14 can determine the width and spacing of the ribs 44, 46. Thus, as explained in greater detail below, by varying the pitch 32 and/or DOE 34, the width and/or spacing of the ribs 44, 46, the amount of stretching the film undergoes, and the effects of the stretching on the physical properties can be varied.

The ribs 44, 46 or ribbed pattern 36, can provide a pleasing appearance and connote strength to a consumer. For example, the stripped pattern 36 can signify that the MD incrementally, cold stretched film 10b has undergone a physical transformation to modify one or more characteristics of the MD incrementally, cold stretched film 10b. For example, MD ring rolling the film 10 can increase or otherwise modify one or more of the tensile strength, tear resistance, impact resistance, or elasticity of the MD incrementally, cold stretched film 10b. The ribbed pattern 36 can signify the physical transformation to a consumer. In one or more embodiments of the invention, cold stretching of a substantially un-pigmented ply or plies can surprisingly modify the appearance of a multi-ply film when the un-pigmented ply or plies is discontinuously laminated to a substantially pigmented ply or plies.

Figure 3A:
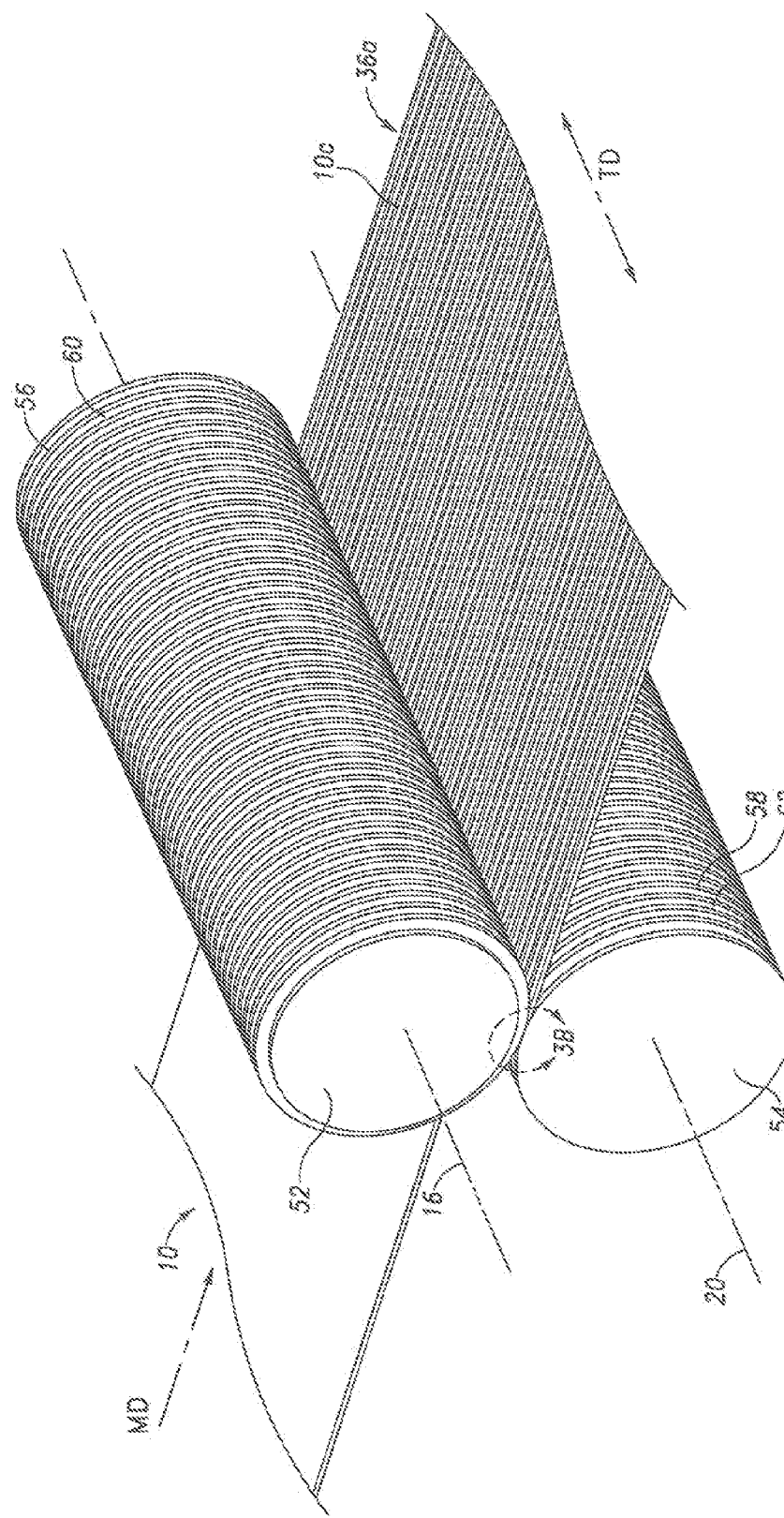
FIG. 3A illustrates a schematic diagram of a thermoplastic film ply being cold stretched by TD intermeshing rollers in accordance with one or more implementations of the present invention.
Figure 3B:
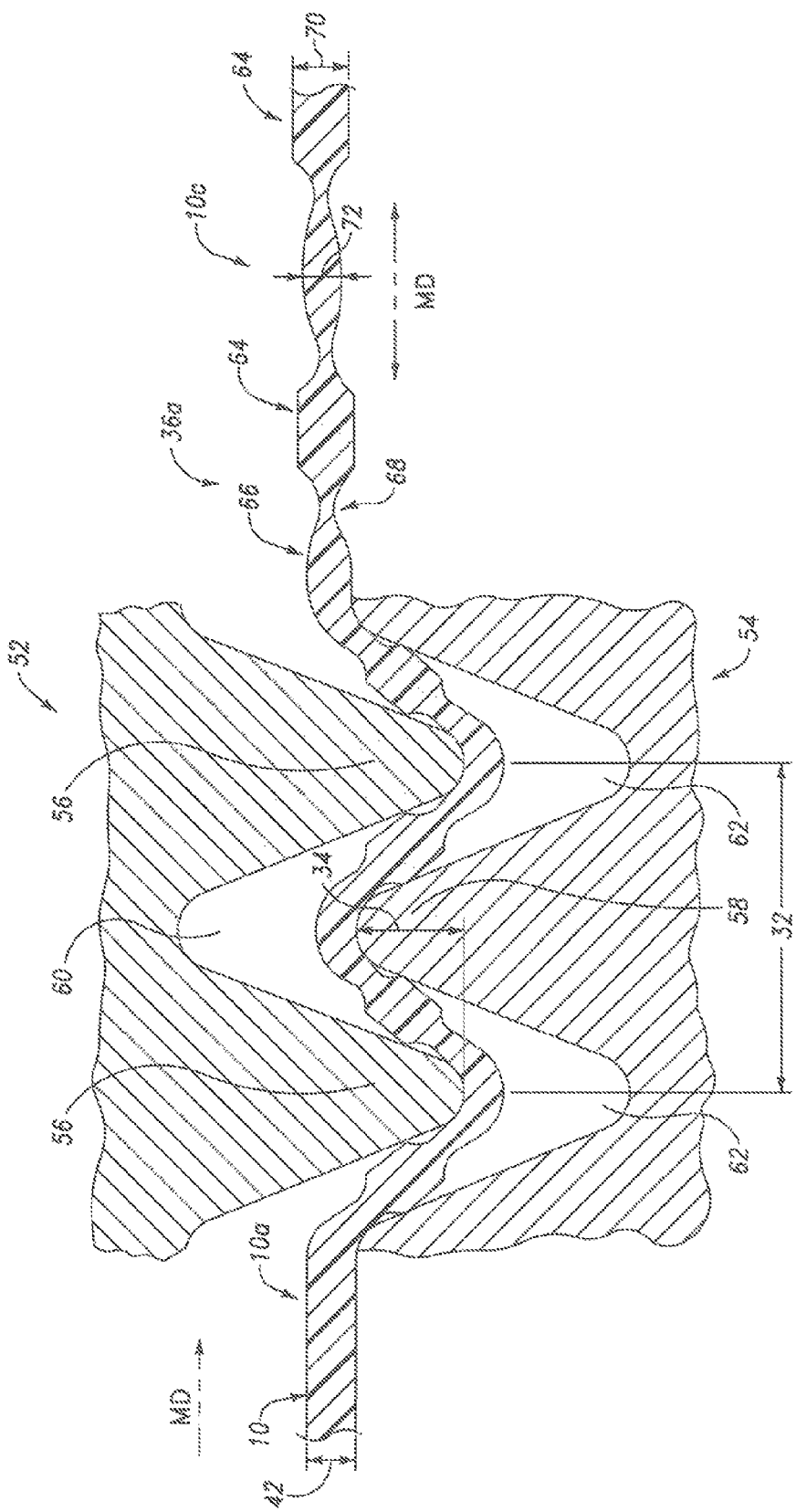
FIG. 3B illustrates an enlarged view of a thermoplastic film passing through the transverse direction intermeshing rollers of FIG. 3A taken along the circle 3B of FIG. 3A to form a cold stretched film ply.

As mentioned previously, MD ring rolling is one exemplary method of incrementally cold stretching a thermoplastic film to create visually-distinct stretched regions in accordance with an implementation of the present invention. TD ring rolling is another suitable method of incrementally cold stretching a film to create visually-distinct stretched regions. For example, FIGS. 3A and 3B illustrate a TD ring rolling process that incrementally stretches a thermoplastic film 10 by passing the film 10 through a pair of TD intermeshing rollers 52, 54. A TD ring rolling processes (and associated TD intermeshing rollers 52, 54) can be similar to the MD ring rolling process (and associated MD intermeshing rollers 12, 14) described herein above, albeit that the ridges 56, 58 and grooves 60, 62 of the TD intermeshing rollers 52, 54 can extend generally orthogonally to the axes of rotation 18, 22.

Thus, as shown by FIG. 3A, as the thermoplastic film 10 passes between the intermeshing rollers 52, 54, the ridges 56, 58 can incrementally cold stretch the film 10 in the transverse direction. In particular, as the film 10 proceeds between the intermeshing rollers 52, 54, the ridges 56, 58 can impart or form a striped pattern 36a into the film 10 to form a TD incrementally, cold stretched film 10c.

Referring specifically to FIG. 3B, various features of the ridges 56, 58 and grooves 60, 62 are shown in greater detail. The pitch and depth of engagement of the ridges 56, 58 can determine, at least in part, the amount of incremental cold stretching created by the intermeshing rollers 52, 54. As shown by FIG. 3B, the pitch 32 is the distance between the tips of two adjacent ridges on the same roller. The "depth of engagement" (DOE) 34 is the amount of overlap between ridges 56, 58 of the different rollers 52, 54 during intermeshing. The ratio of DOE 34 to pitch 32 can determine, at least in part, the amount of stretch imparted by a pair of intermeshing rollers 52, 54.

As the thermoplastic film 10 passes between the intermeshing rollers 52, 54, the ridges 56, 58 can incrementally cold stretch the film 10 in the transverse direction. Additionally, the rollers 52, 54 can impart or form a generally striped pattern 36a into the film 10. As used herein, the terms "impart" and "form" refer to the creation of a desired structure or geometry in a film upon stretching the film that will at least partially retain the desired structure or geometry when the film is no longer subject to any strains or externally applied forces.

FIGS. 3A and 3B illustrate that the film 10a comprises a single ply film. In any event, FIGS. 3A and 3B illustrate the intermeshing rollers 52, 54 can process the film 10a into a TD incrementally, cold stretched film 10c. As previously mentioned, the TD incrementally, cold stretched film 10c can include a striped pattern 36a. The striped pattern 36a can include alternating series of "un-stretched" regions 64 formed between ridges 56, 58, "unstretched" regions 66 at the ridges 56, 58 and stretched regions or thinner ribs 68. Because of the cold stretching process between rollers 52, 54, the thicker ribs 64. 66 are symmetrical about the plane of the film 10 and thinner ribs 68 are symmetrical about the plane of the film 10. In one or more implementations, the "un-stretched" regions 66 of the incrementally-stretched films may be stretched to a small degree. The "un-stretched" regions 66 can be stretched significantly less compared to the stretched regions 68. The "un-stretched" regions 66 can be stretched slightly more compared to the "un-stretched" regions 64. The "un-stretched" regions 66 can have a smooth transition to the stretched regions 68. The "un-stretched" regions 64 can have a sharp transition to the stretched regions 68. The "un-stretched" regions 64 can have a greater length and greater thickness or gauge 70 compared the thickness or gauge 72 of the "un-stretched" regions 66. The "un-stretched" regions 64 can have a greater thickness or gauge 70 compared the thickness or gauge 74 of the stretched regions 68. The "un-stretched" regions 66 can have a greater thickness or gauge 72 compared the thickness or gauge 74 of the stretched regions 68. In one or more implementations, the thicker ribs or un-stretched regions 64, 66 and the thinner ribs or stretched regions 68 are not corrugated and lie in the same plane to give a ribbed flat film.

One will appreciate in light of the disclosure herein that the striped pattern 36a may vary depending on the method used to incrementally stretch the film 10. To the extent that TD ring rolling is used to incrementally cold stretch the film 10, the striped pattern 36a on the film 10 can depend on the pitch 32 of the ridges 56, 58, the DOE 34, and other factors.

Figure 4:
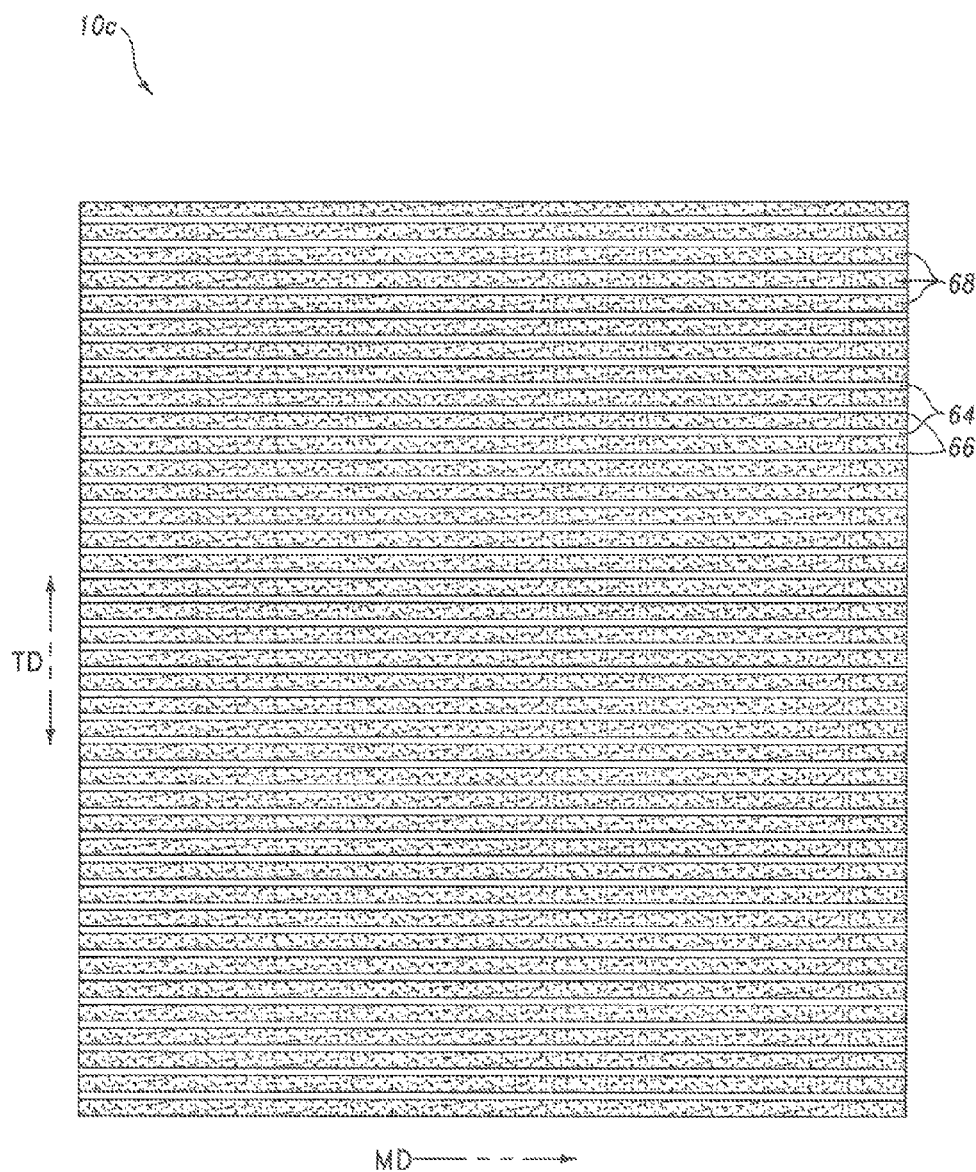
FIG. 4 illustrates a view a cold stretched thermoplastic film ply created by the intermeshing rollers of FIG. 3A.

FIG. 4 illustrates a top view of the TD incrementally-stretched film 10c. The thicker ribs 64, 66 and thinner ribs 68 can extend across the film 10c in a direction transverse (i.e., transverse direction) to a direction in which the film was extruded (i.e., machine direction). The pitch 32 and the DOE 34 of the ridges 56, 58 of the TD intermeshing rollers 52, 54 can determine the width and spacing of the ribs 64, 66, 68. Thus, as explained in greater detail below, by varying the pitch 32 and/or DOE 34, the width and/or spacing of the ribs 64, 66, 68, the amount of stretching the film undergoes, and the effects of the stretching on the physical properties can be varied.

The ribs 64, 66, 68 or ribbed pattern 36a, can provide a pleasing appearance and connote strength to a consumer. For example, the stripped pattern 36a can signify that the TD incrementally, cold stretched film 10c has undergone a physical transformation to modify one or more characteristics of the TD incrementally, cold stretched film 10c. For example, TD ring rolling the film 10 can increase or otherwise modify one or more of the tensile strength, tear resistance, impact resistance, or elasticity of the TD incrementally, cold stretched film 10c. The ribbed pattern 36a can signify the physical transformation to a consumer. In one or more embodiments of the invention, cold stretching of a substantially un-pigmented ply or plies can surprisingly modify the appearance of a multi-ply film when the un-pigmented ply or plies is discontinuously laminated to a substantially pigmented ply or plies.

FIG. 5A illustrates an MD ring rolling process that partially discontinuously laminates the individual adjacent plies 10d, 10e of thermoplastic film by passing the plies 10d, 10e through a pair of MD intermeshing rollers 12, 14, as illustrated in FIG. 1A. As a result of MD ring rolling, the multi-ply, partially discontinuously laminated film 10f is also intermittently, cold stretched in the machine direction MD. In particular, the rollers 12, 14 can include a plurality of protruding ridges 24, 26. For example, the tips of the ridges 24, 26 can have a rounded shape as shown in FIG. 5A. In alternative implementations, the tips of the ridges 24, 26 can have sharp angled corners. FIG. 5A also illustrates that grooves 28, 30 can separate adjacent ridges 24, 26. Additionally, the configuration of the ridges 24, 26 and grooves 28, 30 can affect the amount of stretching and the bond strength resulting from partially discontinuous lamination as the two plies pass through intermeshing rollers 12, 14.

Referring specifically to FIG. 5A, various features of the ridges 24, 26 and grooves 28, 30 are shown in greater detail. The pitch and depth of engagement of the ridges 24, 26 can determine, at least in part, the amount of incremental stretching and partially discontinuous lamination caused by the intermeshing rollers 12, 14. As shown by FIG. 5A, the pitch 32 is the distance between the tips of two adjacent ridges on the same roller. The "depth of engagement" ("DOE") 34 is the amount of overlap between ridges 24, 26 of the different rollers 12, 14 during intermeshing. The ratio of DOE 34 to pitch 32 can determine, at least in part, the bond strength provided by the partially discontinuous bonding. According to one embodiment, the ratio of DOE to pitch provided by any ring rolling operation is less than about 1.2:1, suitably less than about 1.0:1, suitably between about 0.5:1 and about 1.0:1, or suitably between about 0.8:1 and about 0.9:1.

In particular, as the film plies 10d, 10e proceed between the intermeshing rollers 12, 14, the ridges 24 of the first roller 12 can push the film plies 10d, 10e into the grooves 30 of the second roller 14 and vice versa. The pulling of the film plies 10d, 10e by the ridges 24, 26 can cold stretch the film plies 10d, 10e. The rollers 12, 14 may not stretch the film plies 10d, 10e evenly along its length. Specifically, the rollers 12, 14 can stretch the portions of the film plies 10d, 10e between the ridges 24, 26 more than the portions of the film plies 10d, 10e that contact the ridges 24, 26. Thus, the rollers 12, 14 can impart or form a generally striped pattern 36b into the multi-ply film 10f. As used herein, the terms "impart" and "form" refer to the creation of a desired structure or geometry in a film upon stretching the film that will at least partially retain the desired structure or geometry when the film is no longer subject to any strains or externally applied forces.

FIG. 5A illustrates that the film plies 10d, 10e (i.e., the film plies that are yet to pass through the intermeshing rollers 12, 14) can have a substantially flat top surface 38 and substantially flat bottom surface 40. The film plies 10d, 10e can have an initial total thickness or starting gauge 42 (i.e., the sum of 42a and 42b) extending between its major surfaces (i.e., the top surface 38 and the bottom surface 40). In at least one implementation, the starting gauge 42, as well as the gauge 42a, 42b of individual layers 10d and 10e can be substantially uniform along the length of the plies 10d, 10e. Because the inner surfaces of each layer 10d and 10e are somewhat tacky, the layers become lightly bonded together as they are pulled through and cold stretched by intermeshing rollers 12, 14. Those areas that are compressed on the ridges become lightly bonded together.

In one or more implementations, the film plies 10d, 10e need not have an entirely flat top surface 38, but may be rough or uneven, or even have extruded ribs. Similarly, bottom surface 40 or the inner oriented surfaces of plies 10d and 10e can also be rough or uneven, or even have extruded ribs. Further, the starting gauge 42, 42a, and 42b need not be consistent or uniform throughout the entirety of plies 10d, 10e. Thus, the starting gauge 42, 42a, and 42b can vary due to product design, manufacturing defects, tolerances, or other processing issues. According to one embodiment, the individual plies 10d and 10e may already be cold stretched (e.g., through MD ring rolling, TD ring rolling, etc.) before being positioned adjacent to the other layer (10d or 10e, respectively). Such cold stretching of individual plies can result in a striped surface exhibiting an uneven top and bottom surface similar to that seen in FIGS. 1B and 3B.

Figure 5B:
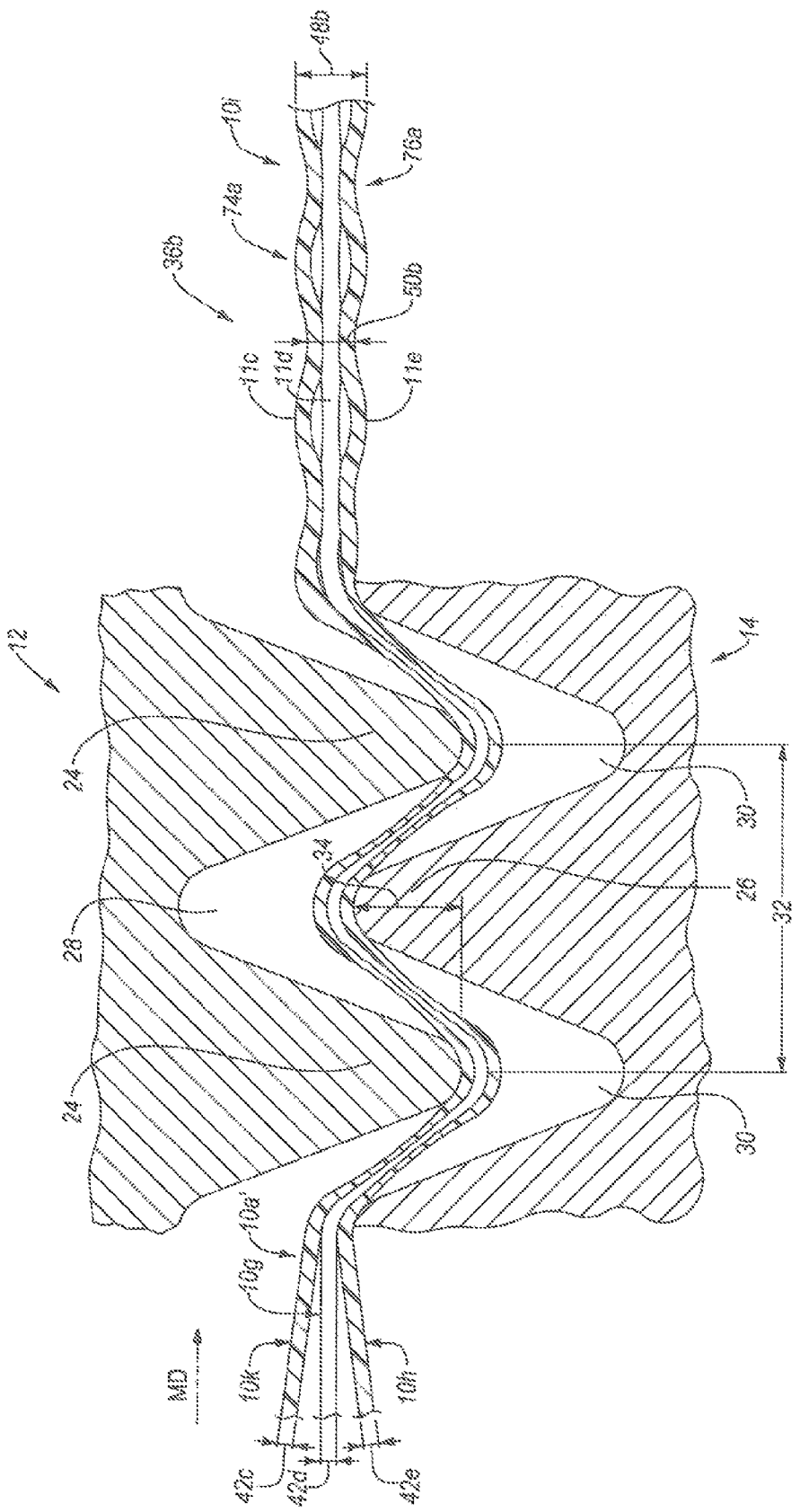
FIG. 5B illustrates a view of another multi-ply laminated thermoplastic film created by the intermeshing rollers of FIG. 1A.

FIG. 5A illustrates that films 10f, can include two initially separate film plies 10d-10e. FIG. 5B illustrates an alternative implementation where the incrementally cold stretched film 10*i* can be produced from three initially separate film plies: a middle film ply 10*g*, and two outer film plies 10*h*, 10*k*. In other embodiments, more than 3 plies may be provided (four, five, six, or more partially discontinuously or discontinuously laminated plies). In one or more embodiments of the invention in a similar manner as in FIG. 5B, cold stretching of substantially un-pigmented outer plies, such as 10*h* and 10*k* can surprisingly modify the appearance of a multi-ply film 10*i* when the un-pigmented plies 10*h*, 10*k* are discontinuously laminated to a substantially pigmented inner ply 10*g* or plies.

As seen in FIGS. 5A and 5B, upon cold stretching and partially discontinuous lamination of the adjacent plies, the multi-ply laminated film 10*f* of FIG. 5A, 10*i* of FIG. 5B, can include a striped pattern 36*b*. The striped pattern 36*b* can include alternating series of un-bonded and un-stretched regions 74 adjacent to bonded and stretched regions 76. FIGS. 5A and 5B illustrate that the intermeshing rollers 12, 14 can incrementally stretch and partially discontinuously bond films plies 10*d*, 10*e* or 10*g*, 10*h*, 10*k* to create multi-ply laminated films 10*f*, 10*i* including bonded regions 76, 76*a* and un-bonded regions 74, 74*a*.

For example, FIG. 5A illustrates that the film plies 10*d*, 10*e* of the multi-ply laminated film 10*f* can be laminated together at the un-stretched regions 76, while the stretched regions 74 may not be laminated together. Similarly, FIG. 5B illustrates that the film layers 10*g*, 10*h*, 10*k* of the multi-ply laminated film 10*i* can be laminated together at the un-stretched regions 76, while the stretched regions 74 may not be laminated together.

In addition to any compositional differences between plies 10*c*, 10*d*, 10*f*, 10*g*, or 10*h* of a given multi-ply film, the different film plies can have differing gauges or thicknesses. In one or more implementations, the film plies may be substantially equal to one another in thickness. For example, the inventors have found that the MD or TD tear resistance of the composite, multi-ply film is typically approximately equal to the lowest MD or TD tear value of the individual plies, absent any increase in tear resistance provided by light bonding between the plies. In other words, the weakest ply often determines the strength of the multi-ply film structure.

In other embodiments, in a manner similar to FIGS. 5A and 5B, two or more film plies may be partially discontinuously laminated and cold stretched together using the TD ring rolling process of FIGS. 3A and 3B to give a multi-ply cold stretched film. In a manner similar to FIGS. 5A and 5B, one or more plies may be substantially un-pigmented and one or more plies may be substantially pigmented.

In accordance with another implementation, a structural elastic like film (SELF) process may be used to create a thermoplastic film with strainable networks, which similarly results in discontinuous bonding of adjacent layers within a multi-layer film. As explained in greater detail below, the strainable networks can include adjacent bonded and un-bonded regions. U.S. Pat. Nos. 5,518,801; 6,139,185; 6,150,647; 6,394,651; 6,394,652; 6,513,975; 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 6:
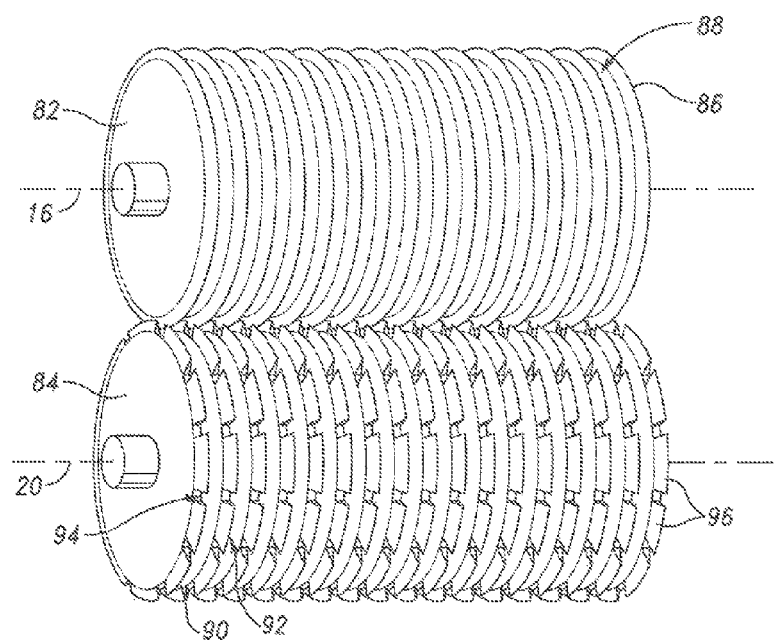
FIG. 6 illustrates a schematic diagram of a set of intermeshing rollers used to form a structural elastic like film (SELF) by imparting cold stretched strainable networks into the film in accordance with one or more implementations of the present invention.

FIG. 6 illustrates a pair of SELF'ing intermeshing rollers 82, 84 for creating cold stretched, strainable networks of a single ply or of lightly bonded multiple plies of film. The first SELF'ing intermeshing roller 82 can include a plurality of ridges 86 and grooves 88 extending generally radially outward in a direction orthogonal to an axis of rotation 16. Thus, the first SELF'ing intermeshing roller 82 can be similar to a TD intermeshing roller 52, 54 of FIG. 3A. The second SELF'ing intermeshing roller 84 can also include a plurality of ridges 90 and grooves 92 extending generally radially outward in a direction orthogonal to an axis of rotation 20. As shown by FIG. 6, however, the ridges 90 of the second SELF'ing intermeshing roller 84 can include a plurality of notches 94 that define a plurality of spaced teeth 96.

Figure 7:
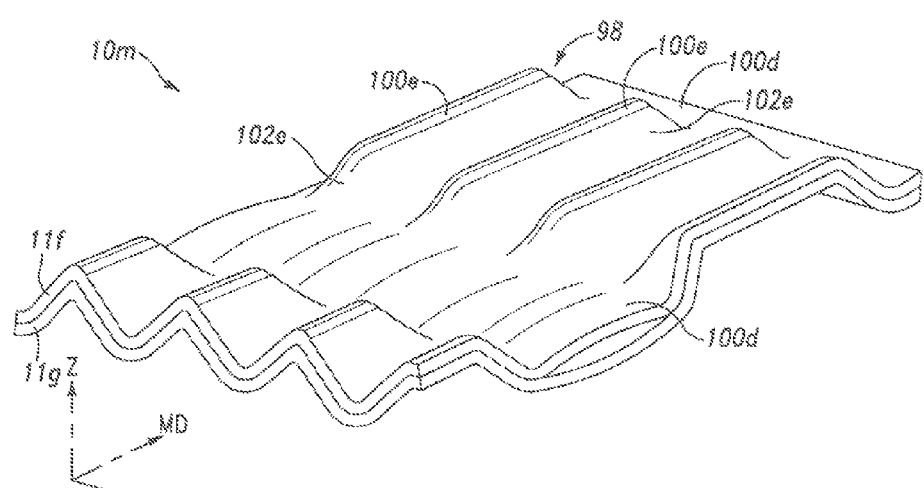
FIG. 7 illustrates a view of a multi-ply, cold stretched, laminated thermoplastic film created by the intermeshing rollers of FIG. 6.

Referring now to FIG. 7, a multi-ply cold stretched and discontinuously laminated film 10*m* with bonded regions dispersed about un-bonded regions created using the SELF'ing intermeshing rollers 82, 84 of FIG. 6 is shown. In particular, as the film passes through the SELF'ing intermeshing rollers 82, 84, the teeth 96 can press a portion of the multi-ply web or film out of plane to cause permanent deformation and stretching of a portion of the film in the Z-direction. The portions of the film that pass between the notched regions 94 of the teeth 96 will be substantially unformed in the Z-direction, resulting in a plurality of deformed, raised, rib-like elements 98. The length and width of rib-like elements 98 depends on the length and width of teeth 96.

As shown by FIG. 7, the strainable network of the multi-ply lightly-laminated film 10*m* can include first un-bonded regions 100*d*, second un-bonded regions 100*e*, and bonded transitional regions 102*e* connecting the first and second un-bonded regions 100*d*, 100*e*. The second un-bonded regions 100*e* and the bonded regions 102*e* can form the raised rib-like elements 98 of the strainable network. The bonded regions 102*e* can be discontinuous or separated as they extend across the multi-layered film 10*m* in both transverse and machine directions. This is in contrast to stripes that extend continuously across a film in one of the machine or transverse directions.

The rib-like elements 98 can allow the multi-ply lightly-laminated film 10*m* to undergo a substantially "geometric deformation" prior to a "molecular-level deformation" or a "macro-level deformation." As used herein, the term "molecular-level deformation" refers to deformation which occurs on a molecular level and is not discernible to the normal naked eye. That is, even though one may be able to discern the effect of molecular-level deformation, e.g., macro-level deformation of the film, one is not able to discern the deformation which allows or causes it to happen. As used herein, the term "macro-level deformation" refers to the effects of "molecular-level deformation," such as stretching, tearing, puncturing, etc. In contrast, the term "geometric deformation," which refers to deformations of multi-ply lightly-laminated film 10*m* which are generally discernible to the normal naked eye, but do not cause the molecular-level deformation when the multi-ply film 10*m* or articles embodying the multi-ply lightly-laminated film 10*m* are subjected to an applied strain. Types of geometric deformation include, but are not limited to bending, unfolding, and rotating.

Thus, upon application of strain, the rib-like elements 98 can undergo geometric deformation before either the rib-like elements 98 or the flat regions undergo molecular-level deformation. For example, an applied strain can pull the rib-like elements 98 back into plane with the flat regions prior to any molecular-level deformation of the multi-layered film 10*m*. Geometric deformation can result in significantly less resistive forces to an applied strain than that exhibited by molecular-level deformation.

In addition to improved properties thus provided by the ability to geometrically deform, the SELF'ing process also discontinuously and lightly laminates adjacent plies of the multi-ply film together, providing the benefits noted above. In particularly, the film plies 11f, 11g can be lightly laminated at stretched regions 102e, but un-bonded at the un-stretched regions 100d and 100e. The strength of the lamination bond is relatively weak, so as to be less than the weakest tear resistance of the individual plies of the multi-ply film. Thus, the lamination bond is broken rather than the individual ply tearing upon application of a force. Typically, tearing in the MD direction requires less applied force than tearing in the TD direction, thus in one embodiment, the lamination bond strength is less than the MD tear resistance of each individual ply of the multi-ply film.

Figure 8:
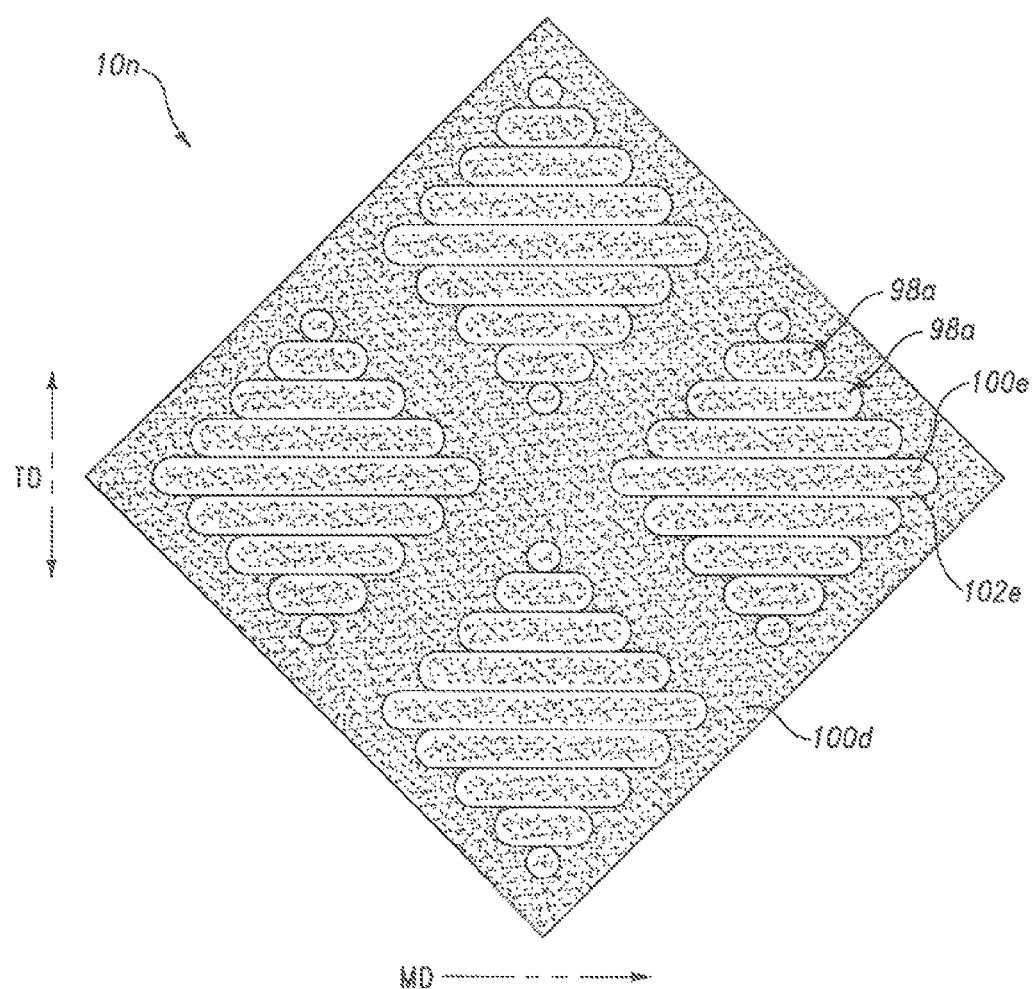
FIG. 8 illustrates a view of a thermoplastic film including cold stretched strainable networks in accordance with one or more implementations of the present invention.

FIG. 8 illustrates a multi-ply lightly-laminated film 10n with a strainable network of rib-like elements 98a arranged in diamond patterns. The strainable network of the multi-ply lightly-laminated film 10n can include first un-bonded regions 100d, second un-bonded regions 100e, and bonded transitional regions 102e connecting the first and second un-bonded regions 100d, 100e.

Figure 9:
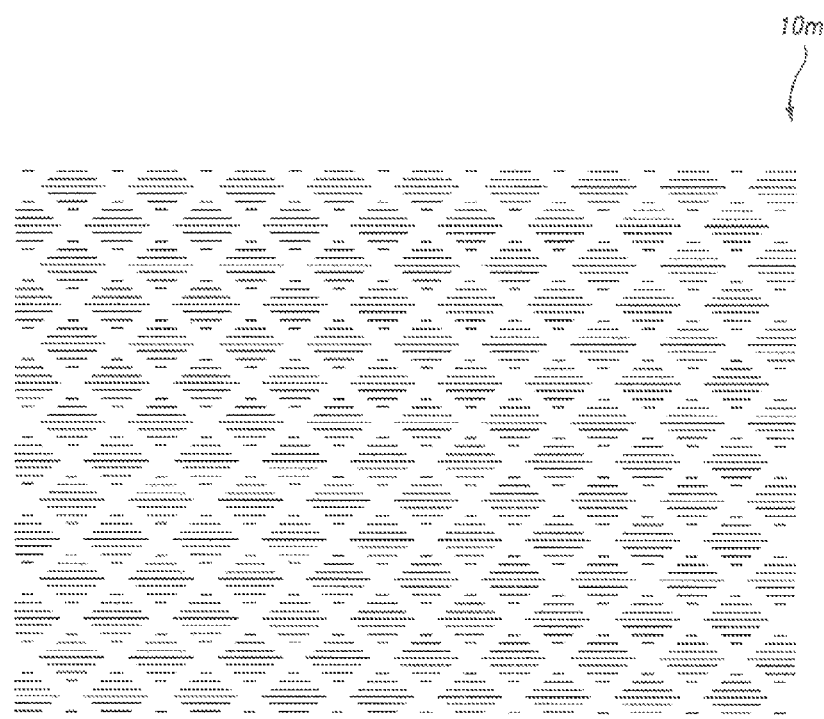
FIG. 9 illustrates a view of another thermoplastic film including cold stretched strainable networks in accordance with one or more implementations of the present invention.

One or more implementations of the present invention can include strainable network patterns other than those shown by FIGS. 7 and 8, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine direction nor the transverse direction. FIG. 9 illustrates a top view of the SELF incrementally, cold stretched film 10m. The SELF'ing process can be used to cold stretch a single ply or multi-ply film. The cold stretched single ply or multi-ply film can then be discontinuously laminated to another film ply. In one or more embodiments of the invention in a similar manner as in FIGS. 6 and 7, cold stretching of a substantially un-pigmented ply, such as 11f, can surprisingly modify the appearance of a multi-ply film 10m when the un-pigmented ply 11f is discontinuously laminated to a substantially pigmented inner ply 11g or plies.

Figure 10:
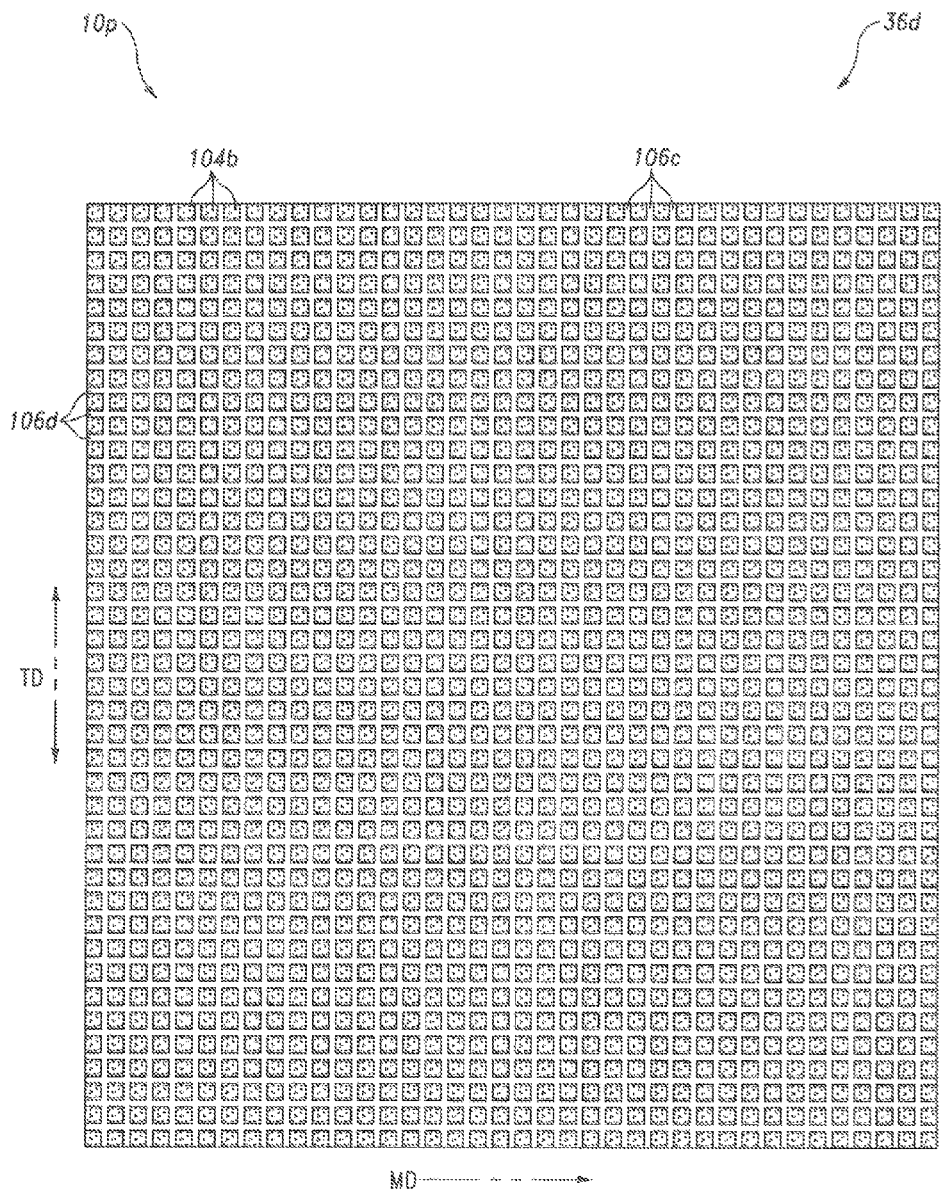
FIG. 10 illustrates a view of a multi-ply film created by the intermeshing rollers of both FIGS. 1A and 3A.
Figure 11:
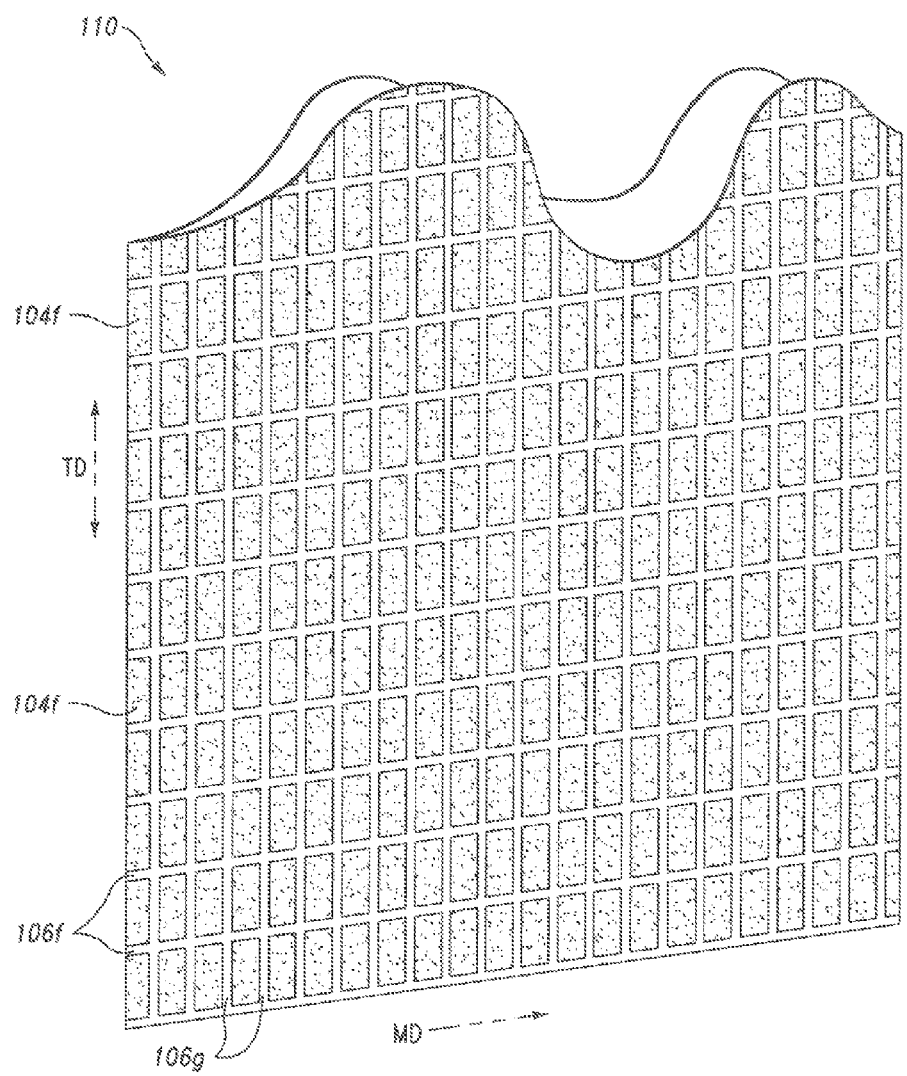
FIG. 11 illustrates a view of a cold stretched and laminated multi-ply trash bag.

In still further implementations, a multi-ply film can undergo both an MD ring rolling process and a TD ring rolling process to cold stretch the individual plies and to lightly bond the individual plies together. For example, FIG. 10 illustrates a top view of a multi-ply lightly-laminated film 10p with bonded regions separated by un-bonded regions created by MD and TD ring rolling. The multi-ply lightly-laminated film 10p can have a grid pattern 36d including alternating series of un-bonded, stretched regions 104b and bonded regions 106b, 106c. In particular, un-bonded regions 104b may comprise a plurality of discrete squares or rectangles while the remainder of the surface comprises a grid of horizontal and vertical bonded regions that are connected together to form a grided discontinuous lamination. The bonded regions 106b, 106c can include stripes 106b that extend along the multi-ply lightly-laminated film 10p in the machine direction, and stripes 106c that extend along the film in the transverse direction, which cross each other. As shown by FIG. 10, in one or more implementations, the aspect ratio of the rows and columns of the bonded regions 106b, 106c can be approximately 1 to 1. In alternative implementations, such as the multi-ply trash bag 110 of FIG. 11 created by MD and TD ring rolling, the aspect ratio of the rows and columns of bonded regions 106f, 106g can be greater or less than 1 to 1. Where one ply is substantially pigmented and the other ply is substantially un-pigmented and stretched either prior to or during lamination, the laminated multi-ply film may give a metallic appearance.

Figure 12:
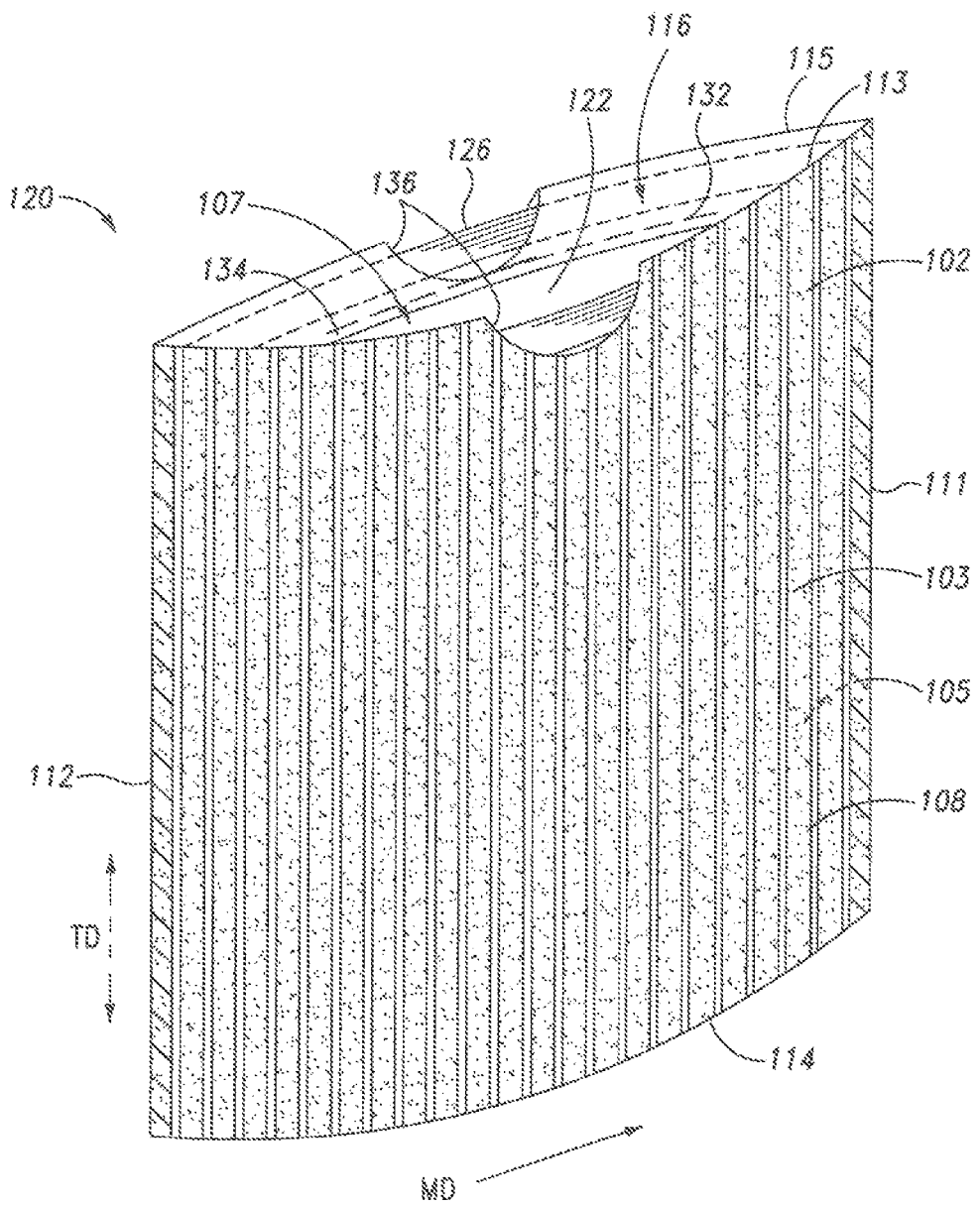
FIG. 12 illustrates a view of a cold stretched and laminated multi-ply trash bag having a draw tape.

FIG. 12 illustrates a multi-ply lightly-laminated trash bag 120, having an interior 107 and an exterior 108. The trash bag 120 is formed with an outer bag 102 having a first sidewall 103 made of flexible thermoplastic web material and a second sidewall 105 of flexible thermoplastic web material, overlaid and joined to the first sidewall 103 to provide an interior 107, the first and second sidewalls 103, 105 joined along a first sealed side edge 111, an opposite second sealed side edge 112, and a closed bottom edge 114, the first and second sidewalls 103, 105 un-joined along their respective top edges 113, 115 to define an opening 116 opposite the bottom edge 114 for accessing the interior 107.

The thrash bag 120 is also formed with an inner bag 122 within the interior 107 of the outer bag 102, the inner bag 122 joined along the first sealed side edge 111 and the second sealed side edge 112 of the outer bag 102. The outer bag 102 and the inner bag 122 are folded over and attached to the inner bag 122 forming a hem 132 having a hem seal 134, the hem 132 including one or more draw tape notches 136 and a draw tape 126 within the hem 132.

In a suitable example, the outer bag web material is substantially un-pigmented and has been stretched by a cold stretch formation process selected from the group consisting of MD ring rolling, TD ring rolling, and strainable network formation and the inner bag web material is substantially pigmented. The other bag may be cold stretched prior to or during lamination to the inner bag, or both. In this example, the outer bag may have a metallic appearance.

The thrash bag 120 is also formed with an inner bag 122 within the interior 107 of the outer bag 102, the inner bag 122 joined along the first sealed side edge 111 and the second sealed side edge 112 of the outer bag 102. The outer bag 102 and the inner bag 122 are folded over and attached to the inner bag 122 forming a hem 132 extending along the open top end 116 disposed opposite the bottom edge 114 of the outer bag 102. The hem 132 has a hem seal 134, the hem 132 including one or more draw tape notches 136 and a draw tape 126 within the hem 132.

Figure 13:
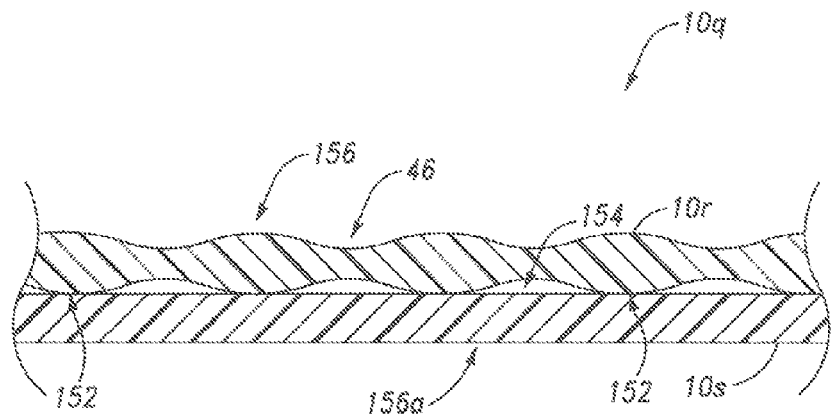
FIG. 13 illustrates a cross-sectional view of a laminated multi-ply film.

FIG. 13 illustrates a cross-sectional view of incrementally-stretched adhesively-laminated multi-ply film 10q. The incrementally stretched, adhesively laminated multi-ply film 10q includes an MD incrementally stretched film ply 10r adhesively laminated to a TD incrementally stretched film ply 10s. In particular, FIG. 13 illustrates that the MD incrementally stretched film ply 10r is adhesively laminated to the TD incrementally stretched film ply 10s by bonds or bond areas 152. The bond areas 152 can be separated in one or more implementations by un-bonded areas 154.

The bond areas 152 shown in FIG. 13 bond the film plies 10r, 10s together at the intersections of the thicker TD extending ribs 156 of MD stretched film ply 10r and the thicker MD extending ribs 156a of TD stretched film ply 10s. The bond areas 152 are discontinuous in both the machine direction and the transverse direction, and thus, form a discontinuous lamination. Where one of the film plies 10r or 10s is substantially un-pigmented and the other of the film plies 10s or 10r is substantially pigmented, then the multi-ply film 10q will have a metallic appearance when viewed from the side of the substantially un-pigmented film ply.

Figure 14A:
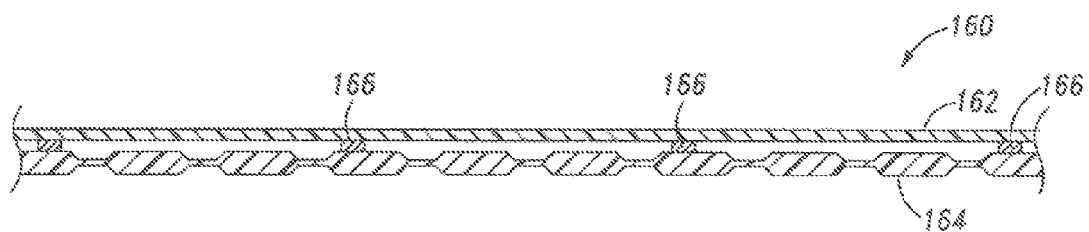
FIG. 14A illustrates a cross-sectional view of a laminated multi-ply film.
Figure 14B:
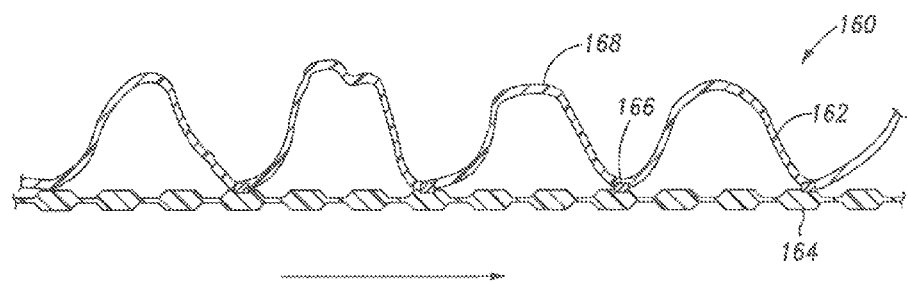
FIG. 14B illustrates a cross-sectional view of a laminated multi-ply film.
Figure 14C:
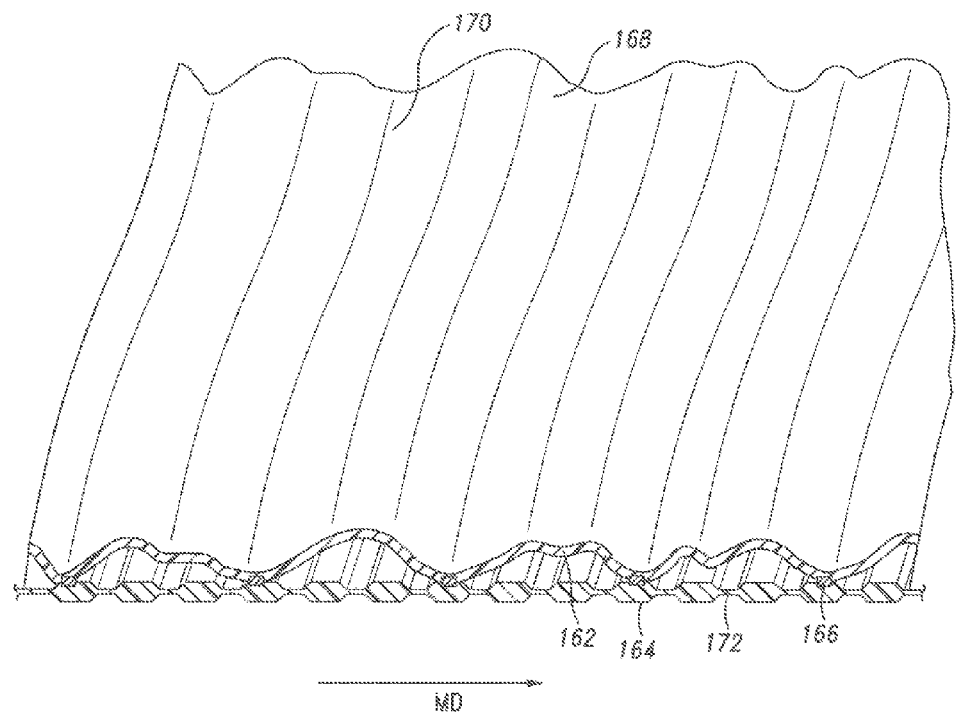
FIG. 14C illustrates a perspective view of the laminated multi-ply film of 14B with a linear bonding pattern.
Figure 14D:
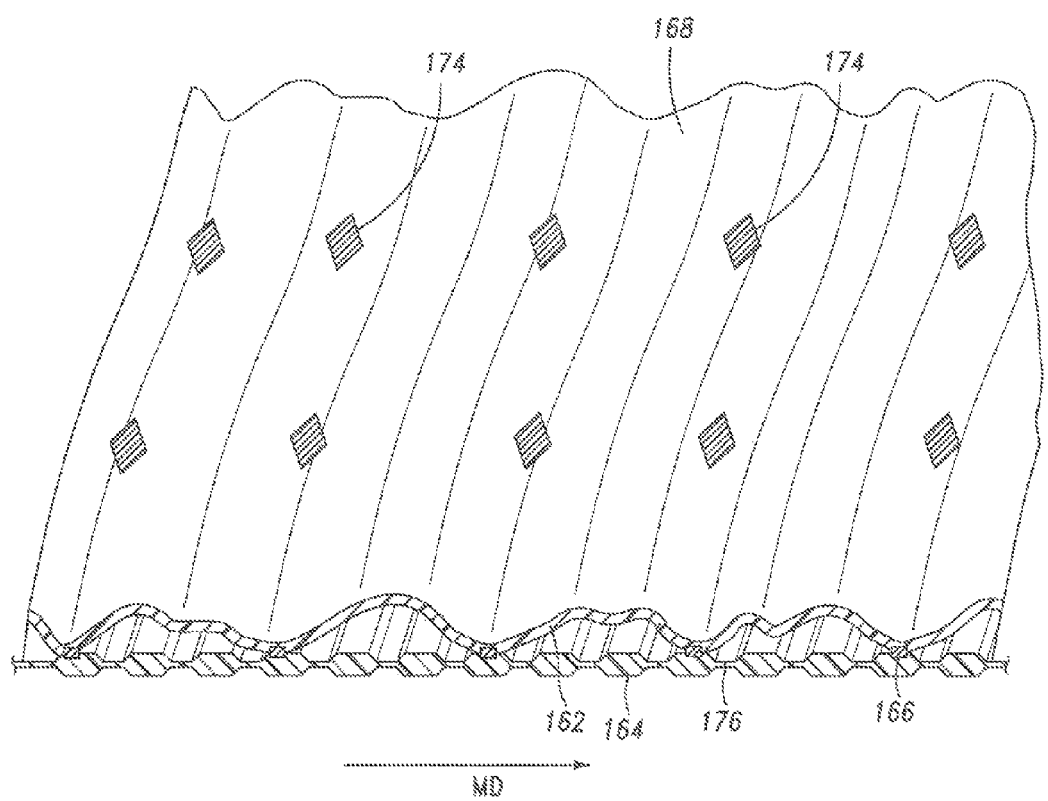
FIG. 14D illustrates a perspective view of the laminated multi-ply film of 14B with a spot bonding pattern.

FIG. 14A illustrates a cross-sectional view of a multi-ply film 160 with a flat ply 162 bonded to a incrementally cold stretched ply 164 where the incrementally cold stretched ply 164 is under tension when the bonds 166 between the flat ply 162 and the incrementally cold stretched ply 164 have been made and where the incrementally cold stretched ply 164 has a higher rebound ratio than the flat ply 162. FIG. 14B shows a cross-sectional view of the multi-ply film 160 where the plies 162, 164 of the multi-ply film 160 are not under tension and the multi-ply film 160 has contracted to give puckers 168 in the flat ply 162. FIG. 14C shows a perspective view of FIG. 14B where the bonding shows laminated stripes 170, giving a partially discontinuous lamination pattern. The lamination process can be any lamination process including, but not limited to, adhesive lamination, embossing lamination, and cold stretching lamination. Where, for example, the ply 162 is substantially pigmented and the cold stretched ply 164 is substantially un-pigmented, the multi-ply film 160 may have a metallic appearance when viewed from the bottom side 172. FIG. 14D shows a perspective view of FIG. 14B where the bonding shows laminated points 174, giving a discontinuous lamination pattern. The lamination process can be any lamination process including, but not limited to, adhesive lamination, embossing lamination, and cold stretching lamination. Where, for example, the ply 162 is substantially pigmented and the cold stretched ply 164 is substantially un-pigmented, the multi-ply film 174 may have a metallic appearance when viewed from the bottom side 176.

EXAMPLES

Example A

Control. A continuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 400 mils apart (formed by extruding the film in a ribbed pattern) and continuously laminating the films together by coextrusion. The laminated film A had a black appearance as shown in Table I.

Example B

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film and laminating the films together discontinuous adhesive lamination. The laminated film B had a slightly silver metallic appearance as shown in Table I.

Example C

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film and laminating the films together by MD ring rolling at 430 DOE with a 400 pitch tool. The laminated film C had a more silver metallic appearance as shown in Table I.

Example D

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a stretched ribbed pattern) and laminating the films together by MD ring rolling at 430 DOE with a 400 pitch tool. The laminated film D had a more silver metallic appearance and shown in Table I.

Example E

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a ribbed pattern) and laminating the films together by TD ring rolling at 20 DOE with a 40 pitch tool. The laminated film E had a more silver metallic appearance and shown in Table I.

Example F

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a ribbed pattern), the un-pigmented film then stretched by MD ring rolling at 430 DOE with a 400 pitch tool and laminating the films together by TD ring rolling at 20 DOE with a 40 pitch tool. The laminated film F had a silvery appearance and shown in Table I.

Example G

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a ribbed pattern), the un-pigmented film then stretched by MD ring rolling at 430 DOE with a 400 pitch tool and laminating the films together the discontinuous application of adhesive. The laminated film F had a silvery appearance and shown in Table I.

TABLE I

| Multi-ply Film Unpigmented on Pigmented | Description | Appearance Black = 0 Silver Metallic = 4 |
|---|---|---|
| Example A - Control | Pigmented - Unstretched Un-Pigmented - Unstretched Continuous lamination | 0 |
| Example B | Pigmented - Unstretched Un-Pigmented - Unstretched Discontinuous Un-Stretched lamination | 1 |
| Example C | Pigmented - Unstretched Un-Pigmented - Unstretched Discontinuous Stretched lamination | 2 |
| Example D | Pigmented - Unstretched Un-Pigmented - Unstretched, non-Flat Discontinuous Stretched lamination | 3 |
| Example E | Pigmented - Unstretched Un-Pigmented - Unstretched, non-Flat Discontinuous Stretched lamination | 3 |

TABLE I-continued

| Multi-ply Film Unpigmented on Pigmented | Description | Appearance Black = 0 Silver Metallic = 4 |
|---|---|---|
| Example F | Pigmented - Unstretched Un-Pigmented - Stretched Discontinuous Stretched lamination | 4 |
| Example G | Pigmented - Unstretched Un-Pigmented - Stretched Discontinuous Un-Stretched lamination | 4 |

The Examples in Table I show that a multi-ply film resulting from the discontinuous lamination of an un-pigmented ply to a pigmented ply, where the un-pigmented ply has been cold stretched by prior to or during lamination, will have a noticeably metallic appearance.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A laminated multi-ply thermoplastic film comprising:
   a first film ply being substantially un-pigmented and cold stretched; and
   a second film ply being substantially pigmented with a nonmetallic pigment;
   wherein the first film ply and the second film ply are laminated by a lamination process resulting in lamination selected from the group consisting of discontinuous lamination, partially discontinuous lamination, and grided discontinuous lamination; and
   wherein the laminated multi-ply thermoplastic film has a metallic appearance.

2. The film of claim 1, wherein the lamination process comprises cold stretched lamination.

3. The film of claim 2, wherein the lamination process comprises MD ring rolling.

4. The film of claim 2, wherein the lamination process comprises TD ring rolling.

5. The film of claim 2, wherein the lamination process comprises strainable network formation.

6. The film of claim 1, wherein the lamination process comprises un-stretched lamination.

7. The film of claim 1, wherein the nonmetallic pigment is carbon black.

8. The film of claim 1, wherein the lamination process in partially discontinuous lamination.

9. The film of claim 1, wherein the lamination process in gridded discontinuous lamination.

10. A laminated multi-ply thermoplastic film comprising:
    a first film ply being substantially unpigmented; and
    a second film ply being substantially pigmented with a nonmetallic pigment;
    wherein the first film ply and the second film ply are laminated by a lamination process resulting in lamination selected from the group consisting of discontinuous lamination, partially discontinuous lamination, and grided discontinuous lamination, wherein the lamination process that results in cold stretching of the first film ply; and
    wherein the laminated multi-ply thermoplastic film has a metallic appearance.

11. The film of claim 10, wherein the substantially pigmented ply comprises pigmented with carbon black.

12. The film of claim 10, wherein the lamination process comprises MD ring rolling.

13. The film of claim 10, wherein the lamination process comprises TD ring rolling.

14. The film of claim 10, wherein the lamination process comprises strainable process network formation.

* * * * *